(12) United States Patent
Noguchi (10) Patent No.: US 10,344,696 B2
(45) Date of Patent: Jul. 9, 2019

(54) ENGINE KNOCKING DETECTION APPARATUS

(71) Applicant: YAMABIKO CORPORATION, Ohme-shi, Tokyo (JP)

(72) Inventor: Masanori Noguchi, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 0 days.

(21) Appl. No.: 15/867,191

(22) Filed: Jan. 10, 2018

(65) Prior Publication Data

US 2018/0238256 A1    Aug. 23, 2018

(30) Foreign Application Priority Data

Feb. 22, 2017    (JP) ................. 2017-031405

(51) Int. Cl.

| | | |
|---|---|---|
| F02D 41/14 | (2006.01) | |
| F02P 3/04 | (2006.01) | |
| F02P 11/06 | (2006.01) | |
| G01L 23/22 | (2006.01) | |
| F02P 1/00 | (2006.01) | |
| B27B 17/00 | (2006.01) | |
| F02D 35/02 | (2006.01) | |

(Continued)

(52) U.S. Cl.
CPC ..... *F02D 41/1454* (2013.01); *F02D 41/1495* (2013.01); *F02D 41/1498* (2013.01); *F02P 1/005* (2013.01); *F02P 3/0414* (2013.01); *F02P 11/06* (2013.01); *G01L 23/221* (2013.01); *B27B 17/00* (2013.01); *F02D 35/027* (2013.01); *F02D 2041/1472* (2013.01); *F02N 3/02* (2013.01); *F02P 5/152* (2013.01)

(58) Field of Classification Search
CPC .. F02D 41/14; F02D 41/1454; F02D 41/1495; F02D 41/1498; F01L 23/221; F02P 3/04; F02P 3/0414; F02P 11/06
USPC ................ 123/594, 599, 634, 635, 600, 602
See application file for complete search history.

(56) References Cited

U.S. PATENT DOCUMENTS 4,316,440 A * 2/1982 Yamaguchi .............. G01H 1/00
                                                              73/35.09
5,144,928 A    9/1992 Komurasaki
(Continued)

FOREIGN PATENT DOCUMENTS

JP    H04-94440 A    3/1992
JP    11-82032 A    3/1999
(Continued)

*Primary Examiner* — John Kwon
*Assistant Examiner* — Johnny H Hoang
(74) *Attorney, Agent, or Firm* — Brinks Gilson & Lione (57) ABSTRACT

Provided is an engine knocking detection apparatus capable of reasonably implementing necessary measures for water and dust proofing and against breaking of a cable, and the like at low cost as well as precisely detecting and effectively suppressing or avoiding knocking while suppressing cost and weight increases as much as possible. The engine knocking detection apparatus is adapted to detect knocking in an engine that adopts a flywheel magneto ignition system with an ignition coil unit securely attached to a cylinder, the ignition coil unit including an iron core, a coil wound around the iron core, and a control circuit board attached to the coil, and has an accelerometer for knocking detection attached to the iron core of the ignition coil unit.

9 Claims, 6 Drawing Sheets (51) Int. Cl.
*F02N 3/02* (2006.01)
*F02P 5/152* (2006.01)

(56) References Cited

U.S. PATENT DOCUMENTS

| | | | | |
|---|---|---|---|---|
| 5,392,753 | A * | 2/1995 | Burson | F02P 1/086 |
| | | | | 123/406.57 |
| 5,459,449 | A * | 10/1995 | Ravas, Jr. | B60R 21/0173 |
| | | | | 280/735 |
| 6,644,276 | B2 * | 11/2003 | Yoshikawa | F02B 61/045 |
| | | | | 123/149 A |
| 2005/0225925 | A1 * | 10/2005 | Sibrai | B60R 21/0173 |
| | | | | 361/247 |
| 2005/0241627 | A1 * | 11/2005 | Ward | F02P 3/04 |
| | | | | 123/634 |
| 2007/0246029 | A1 * | 10/2007 | Ayusawa | F02P 1/005 |
| | | | | 123/634 |
| 2010/0132679 | A1 | 6/2010 | Kawamura et al. | |
| 2011/0234356 | A1 * | 9/2011 | Rohl | H01F 27/2847 |
| | | | | 336/192 |
| 2012/0255530 | A1 * | 10/2012 | Olsson | F02P 3/0414 |
| | | | | 123/644 |
| 2015/0122239 | A1 * | 5/2015 | Tojo | F02P 3/0453 |
| | | | | 123/609 |
| 2016/0195055 | A1 | 7/2016 | Suzuki et al. | |

FOREIGN PATENT DOCUMENTS

| | | | |
|---|---|---|---|
| JP | 2010-133305 A | 6/2010 | |
| JP | 2015-078620 A | 4/2015 | |

\* cited by examiner

At the time of normal combustion

FIG. 7B

At the time of occurrence of knocking

ENGINE KNOCKING DETECTION APPARATUS

CROSS REFERENCE TO RELATED APPLICATIONS

The present application claims priority from Japanese patent application JP 2017-031405 filed on Feb. 22, 2017, the content of which is hereby incorporated by reference into this application.

BACKGROUND

Technical Field

The present disclosure relates to a knocking detection apparatus adapted to detect knocking (irregular combustion) in a small reciprocating engine for use in portable power working machines, such as chain saws and brush cutters, small power generators, small boats, and the like, and in particular, to a knocking detection apparatus suitable for an engine that adopts a flywheel magneto ignition system for performing ignition.

Background Art

Recently, for reduction of greenhouse gases such as carbon dioxide, air pollution control, conservation of the natural environment, and the like, small single-cylinder reciprocating engines for use in portable power working machines, such as chain saws and brush cutters, have also been required to comply with emission control, that is, to operate in a further lean burn state in terms of the air-fuel ratio, for example. In addition, oxygenated fuel other than gasoline, such as ethanol and biofuel, is occasionally mixed to be used. Therefore, also in this type of small engines, knocking (irregular combustion) is more likely to occur than before.

Further, in the aforementioned small engines, since the engine is started by means of a recoil starter (manually driven) instead of a starter motor (motor driven) for weight reduction or the like, most of such small engines do not have a battery for driving a starter motor or for ignition mounted thereon. Thus, they adopt a flywheel magneto ignition system for performing ignition. Specifically, with the use of an electromotive force generated when a magnet (permanent magnet) provided in a flywheel or the like traverses an ignition coil securely attached to a predetermined portion on a cylinder side, a high voltage is instantly applied to a spark plug to cause spark discharge between electrodes, so that ignition in sync with the rotation of a crank shaft is performed (see, for example, JP H11-82032 A (1999) and JP 2010-133305 A).

SUMMARY

When knocking occurs in the small engine for use in the aforementioned portable power working machines and the like, unpleasant vibration and noise are generated in the engine. This may possibly cause damage or failure to the engine and also deteriorates the feeling of operation, operability, workability, and the like, resulting in reduction in reliability and product value.

Meanwhile, in a multi-cylinder engine mounted on vehicles or the like, typically, a knocking sensor is securely attached to a stationary portion, such as a cylinder block, and an ECU that has a microcomputer incorporated therein is installed in an appropriate portion inside the vehicle, so that knocking is controlled to be suppressed or avoided based on a signal received from the knocking sensor (ignition timing control, air-fuel ratio control, and the like) (see, for example, JP H04-94440 A (1992) and JP 2015-78620 A).

In the aforementioned small engine, however, a knocking sensor is not adopted so far, and knocking is thus not controlled to be suppressed or avoided. This is because knocking sensors and ECUs for engines mounted on vehicles or the like are costly and large in size, and may also require a large, high-capacity battery. Therefore, the adoption of such a knocking sensor in the small engine is difficult in terms of cost, weight, installation portion, installation space, and the like. In addition, specific measures (for water and dust proofing and against vibration and high heat, and the like) are also necessary depending on use conditions (for example, the type of the portable power working machine and the place where it is used).

The present disclosure has been made in view of the aforementioned circumstances, and provides an engine knocking detection apparatus capable of reasonably implementing necessary measures for water and dust proofing and against breaking of a cable, and the like at low cost as well as precisely detecting and effectively suppressing or avoiding knocking while suppressing cost and weight increases as much as possible.

According to an embodiment of the present disclosure, there is provided an engine knocking detection apparatus that is basically adapted to detect knocking in an engine that adopts a flywheel magneto ignition system with an ignition coil unit securely attached to a cylinder, the ignition coil unit including an iron core, a coil wound around the iron core, and a control circuit board attached to the coil, and that has an accelerometer for knocking detection attached to or mounted on the iron core or the control circuit board of the ignition coil unit.

The accelerometer is preferably in a plate or a sheet form and disposed in parallel with a plane orthogonal to a crank shaft of the engine.

The accelerometer is preferably attached to or mounted on a surface on a side opposite to a cylinder side of the iron core or the control circuit board.

The accelerometer is preferably disposed on a lateral side of a microcomputer mounted on the control circuit board.

In a preferred aspect, the coil, the control circuit board, and the accelerometer are covered with a resin molded cover.

The accelerometer is preferably directly attached to the iron core and connected to the control circuit board by means of a signal wire.

The accelerometer is preferably mounted on a mounting plate portion that is provided in an extended manner on a lateral side of the control circuit board and adapted to detect vibration of the cylinder or the iron core via a vibration transmitting member.

The mounting plate portion is preferably provided in an extended manner on the lateral side of the control circuit board via a constricted portion of narrow width.

The mounting plate portion is preferably provided in an extended manner up to a position where it faces the iron core, and the vibration transmitting member is interposed between the mounting plate portion and the iron core.

In the engine knocking detection apparatus according to the present disclosure, in the engine that adopts the flywheel magneto ignition system, since the accelerometer for knocking detection is attached to the rigid iron core of the ignition coil unit, which is firmly fixed on the cylinder side, directly or indirectly via the vibration transmitting member or the like, the detection sensitivity for vibration (acceleration) is very high.

In addition, since the accelerometer and the control circuit board are not far apart from each other, they can be connected to each other by means of a relatively short signal wire or the like. Therefore, knocking can be precisely detected while cost and weight increases can be suppressed as much as possible, and as a result, knocking can be effectively suppressed or avoided.

Further, since the coil, control circuit board, accelerometer, and the like can be air-tightly covered with the resin molded cover, measures for water and dust proofing and against breaking of a cable, and the like can be reasonably implemented at low cost.

DETAILED DESCRIPTION

Embodiments of the present disclosure will be described below with reference to the drawings.

Figure 1:
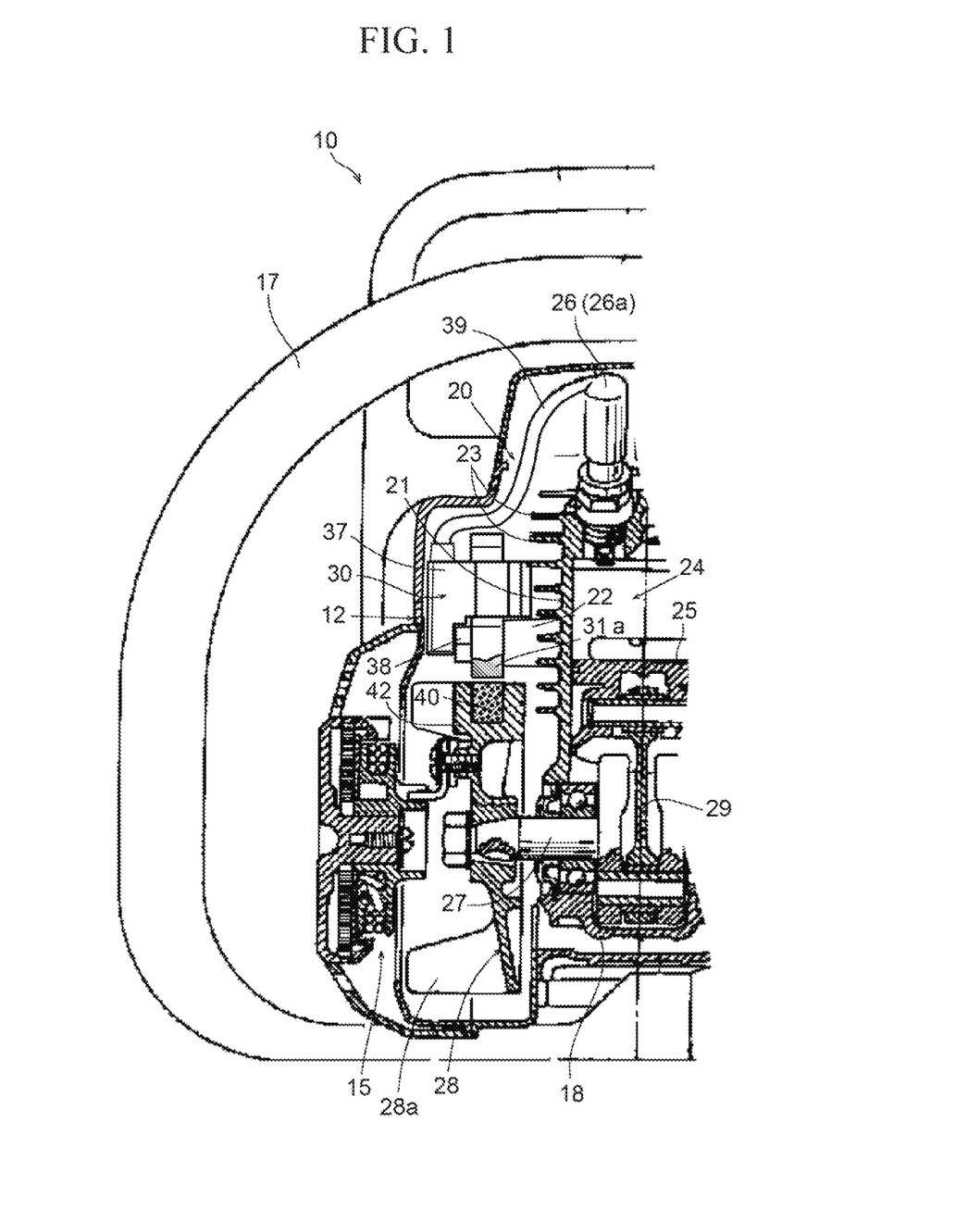
FIG. 1 is a partially-cut schematic cross-sectional view showing an example of a chain saw having mounted thereon an engine that adopts a first embodiment of an engine knocking detection apparatus according to the present disclosure.

FIG. 1 is a partially-cut schematic cross-sectional view showing an example of a chain saw having mounted thereon an engine that adopts a first embodiment of an engine knocking detection apparatus according to the present disclosure.

A chain saw 10 shown as an example in the drawing that is well known has mounted thereon a small single-cylinder air-cooled two-stroke gasoline engine 20 (for example, around 20 to 30 cc in displacement) (hereinafter simply referred to as an engine 20) as a power source, around the center of a main body housing 12 made of synthetic resin, with the cylinder vertically positioned. The main body housing 12 has attached to its front side a guide bar (not shown) to be wound around with a saw chain, and the saw chain is adapted to be rotationally driven by the engine 20.

The main body housing 12 has a rear handle (not shown) disposed on its rear and a front handle 17 in a substantially C-shape or a loop shape disposed on the periphery around its center.

The engine 20 includes a cylinder 21 whose body and head are integrally formed through, for example, aluminum die-casting, and a semi-cylindrical crank case 18 that is air-tightly coupled with the bottom portion of the cylinder 21.

A piston 25 is fit-inserted in the body of the cylinder 21 in a vertically slidable manner, a crank shaft 27 is rotatably supported such that it extends along the boundary between the cylinder 21 and the crank case 18, and the piston 25 is connected to the crank shaft 27 via a connecting rod 29. A combustion chamber 24 is formed above the piston 25 of the cylinder 21 and a spark plug 26 with a cap 26a is attached to the head of the cylinder 21 such that it faces the inside of the combustion chamber 24 (also referred to as the inside of a barrel). Multiple cooling fins 23 are provided on the periphery of the combustion chamber 24 of the cylinder 21.

A flywheel 28 with vanes 28a that also functions as a cooling fan is attached to an end of the crank shaft 27, and a recoil starter 15 is connected to a side portion (left side in FIG. 1) of the flywheel 28.

Further, in the engine 20 of the present example, the flywheel 28 and the cylinder 21 are provided with a magnet 40 and an ignition coil unit 30, respectively, so as to perform ignition using the flywheel magneto ignition system.

Figure 2:
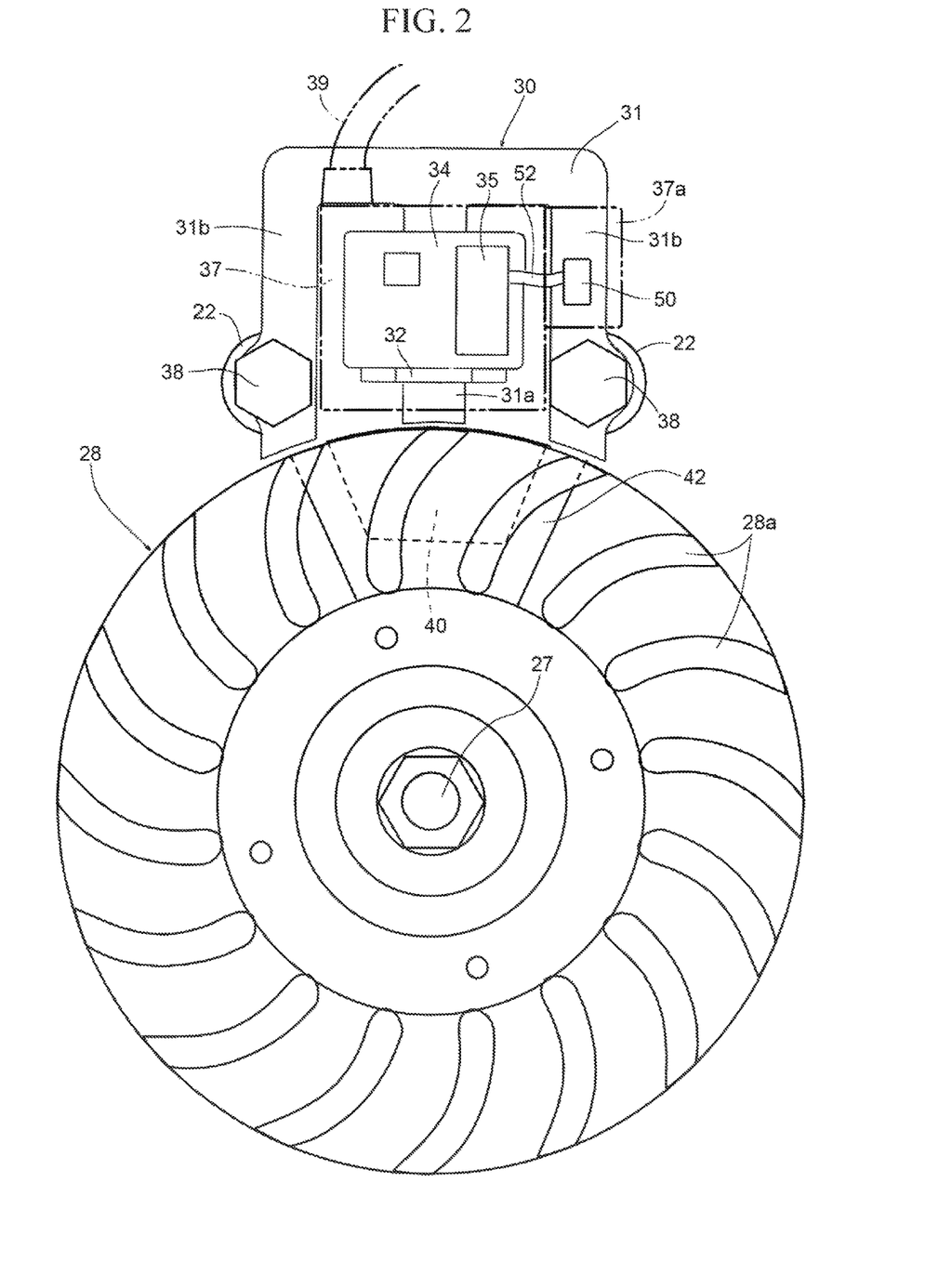
FIG. 2 is a front view showing an ignition coil unit and a flywheel of the first embodiment.

Specifically, a holder 42 having a lateral hole with a rectangular cross-section is provided in a predetermined position on the periphery of the flywheel 28, and the magnet 40 with a sector shape in plan view and with a rectangular cross-section is securely fitted in the holder 42 such that the end surface on the periphery side thereof is exposed (see FIG. 2 as well as FIG. 1).

Figure 3:
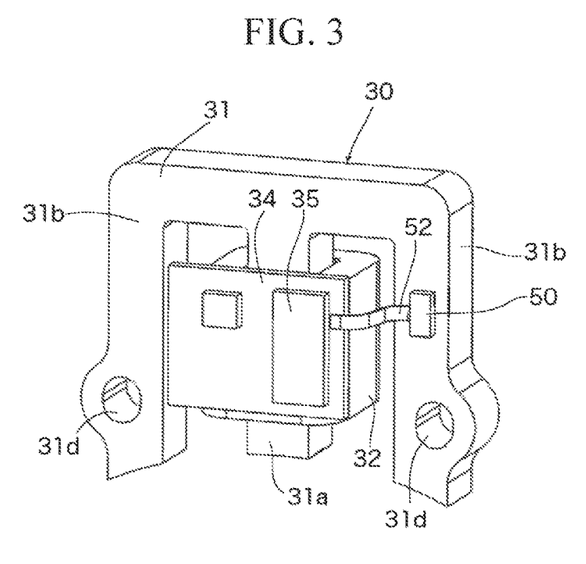
FIG. 3 is a perspective view of the ignition coil unit (without a resin molded cover) of the first embodiment.
Figure 4:
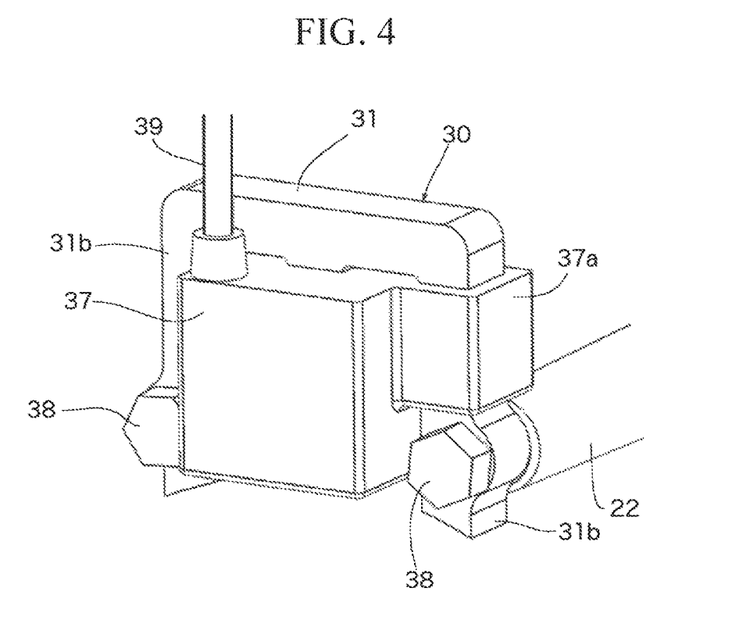
FIG. 4 is a perspective view showing the ignition coil unit of the first embodiment in a securely attached state.

Furthermore, the ignition coil unit 30 is provided on the periphery of the flywheel 28 (above the flywheel 28 in the example shown in the drawing) of the cylinder 21 such that the ignition coil unit 30 is allowed to face the magnet 40. As shown in FIG. 2 to FIG. 4, the ignition coil unit 30 includes an iron core 31 formed by stacking rigid steel plates in an E-shape in plan view, a coil 32 (primary coil, secondary coil) wound around a center piece 31a of the iron core 31, and a control circuit board 34 for ignition attached via an insulator (not shown) to a surface on the side opposite to the cylinder 21 side of the coil 32. A microcomputer 35 including a CPU, ROM, RAM, input/output circuit, and the like, as well as a switching element, a capacitor functioning as a small, low-capacity battery, and other necessary electronic components such as terminals are mounted on the control circuit board 34. In addition, the coil 32 and the control circuit board 34 are air-tightly covered with a resin molded cover 37. The ignition coil unit 30 is firmly fixed to the cylinder 21 such that through hole portions 31d at free ends on side ends of opposite end pieces 31b of the E-shaped iron core 31 are screwed with bolts 38 to bosses 22 provided in predetermined portions of the cylinder 21.

It should be noted that the resin molded cover 37 is formed such that the inside of a resin cover to cover the coil 32 and the control circuit board 34 (and also an accelerometer 50 and flexible cable 52 that will be described later) is filled with a molding resin to be molded.

In the engine 20 provided with such an ignition coil unit 30, with the use of an electromotive force generated when the magnet 40 provided in the flywheel 28 traverses the ignition coil unit 30 securely attached to the cylinder 21, a high voltage is instantly generated and applied to the spark plug 26 via a cable 39 to cause spark discharge in the plug gap, so that ignition in sync with the rotation of the crank shaft 27 is performed.

In addition to the aforementioned configuration, in the engine 20 of the present example, an accelerometer 50 in a thin plate or a sheet form for knocking detection that uses a piezoelectric element is attached, with an adhesive or the like, to a position on a surface on the side opposite to the cylinder 21 side of one of the end pieces 31*b* of the iron core 31 and on a lateral side of the microcomputer 35 mounted on the control circuit board 34 of the ignition coil unit 30. In this case, as the iron core 31 is disposed in substantially parallel with a plane orthogonal to the crank shaft 27, the accelerometer 50 is also disposed in substantially parallel with the plane orthogonal to the crank shaft 27, so that the accelerometer 50 is adapted to mainly detect vibration of the iron core 31 in a direction along (axial direction of) the crank shaft 27.

The accelerometer 50 and an input portion of the microcomputer 35 of the ignition coil unit 30 are connected by means of a flat flexible cable 52 as a signal wire. A small covering portion 37*a* to cover the accelerometer 50 and flexible cable 52 is provided in a projecting manner from one side of the resin molded cover 37 to cover the coil 32 and control circuit board 34.

Vibration of the cylinder 21, that is, a signal in accordance with the acceleration is obtained from the accelerometer 50 via the iron core 31. A control unit including the microcomputer 35 determines, based on the signal obtained from the accelerometer 50, whether knocking has occurred, and when knocking is determined to have occurred, the control unit controls the knocking to be suppressed or avoided by performing, for example, processing of retarding the ignition timing.

Figure 7A:
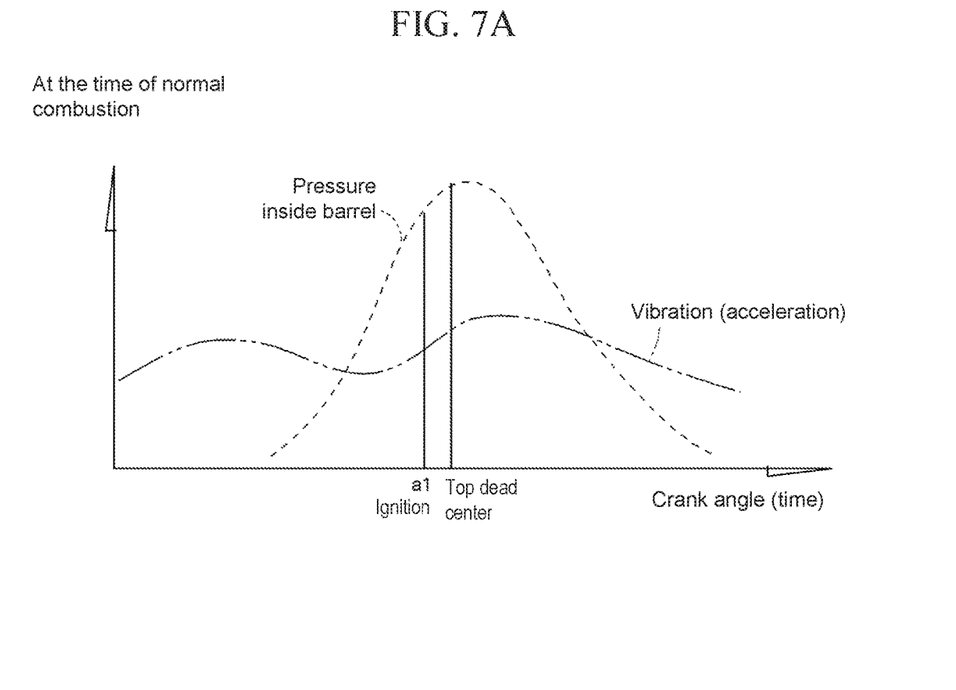
FIGS. 7A and 7B are graphs where the horizontal axes represent the crank angle (time), showing changes in pressure inside a barrel and vibration (acceleration) of a cylinder at the time of normal combustion (FIG. 7A) and occurrence of knocking (FIG. 7B).
Figure 7B:
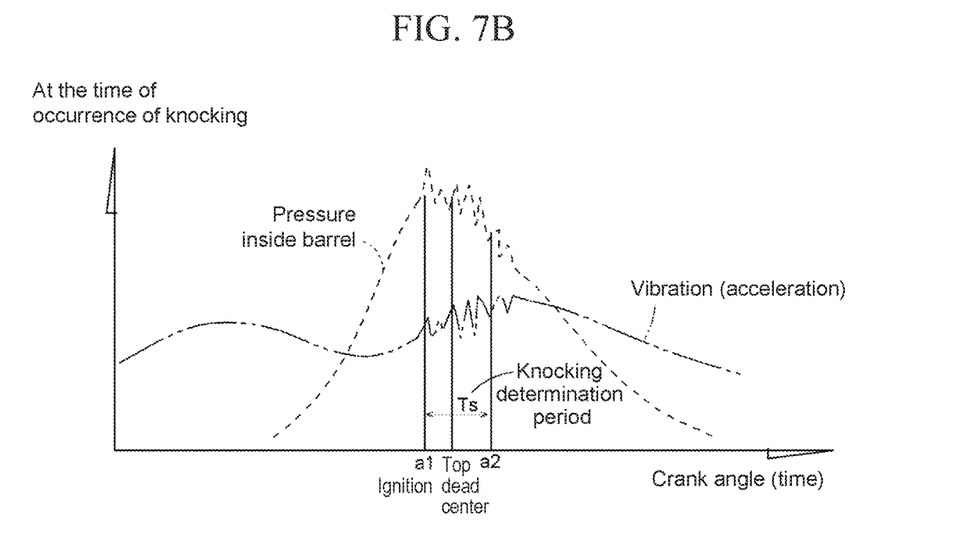

Herein, FIGS. 7A and 7B are graphs where the lateral axes represent the crank angle (time), showing changes in pressure inside the barrel and vibration (acceleration) of the cylinder at the time of normal combustion (FIG. 7A) and occurrence of knocking (FIG. 7B). As can be understood from the graphs, at the time of normal combustion, as the piston is nearing top dead center, the pressure inside the barrel increases. For example, when ignition takes place at around 10 degrees (a1) before top dead center, the pressure inside the barrel reaches the highest, for example, at around 10 degrees after top dead center, drawing a line in a clear inverted-V shape. The vibration (acceleration obtained from the accelerometer 50) changes such that a gradual wave line is drawn. To the contrary, at the time of occurrence of knocking, the pressure inside the barrel significantly changes immediately after the ignition until, for example, around 20 degrees after top dead center, and the vibration (acceleration obtained from the accelerometer 50) also significantly changes, accordingly. In the microcomputer 35 of the present example, for example, the period of from the time of ignition taking place to, for example, around 20 degrees (a2) after top dead center when the vibration (acceleration) significantly changes is defined as a knocking determination period Ts, and the vibration (acceleration) and displacement (amplitude) during the knocking determination period Ts are compared to respective preset thresholds, so as to determine whether knocking has occurred.

As described above, in the knocking detection apparatus of the present embodiment, in the engine 20 that adopts the flywheel magneto ignition system, since the accelerometer 50 in a thin plate or a sheet form for knocking detection is directly attached to the rigid iron core 31 of the ignition coil unit 30 firmly fixed on the cylinder 21 side, the detection sensitivity for vibration (acceleration) is very high.

In addition, since the accelerometer 50 and the control circuit board 34 are not far apart from each other, they can be connected to each other by means of the flexible cable 52 as a relatively short signal wire. Therefore, knocking can be precisely detected while cost and weight increases can be suppressed as much as possible, and as a result, knocking can be effectively suppressed or avoided.

Further, since the coil 32, the control circuit board 34, the accelerometer 50, and the flexible cable 52 are air-tightly covered with the resin molded cover 37, measures for water and dust proofing and against breaking of a cable, and the like can be reasonably implemented at low cost.

Figure 5:
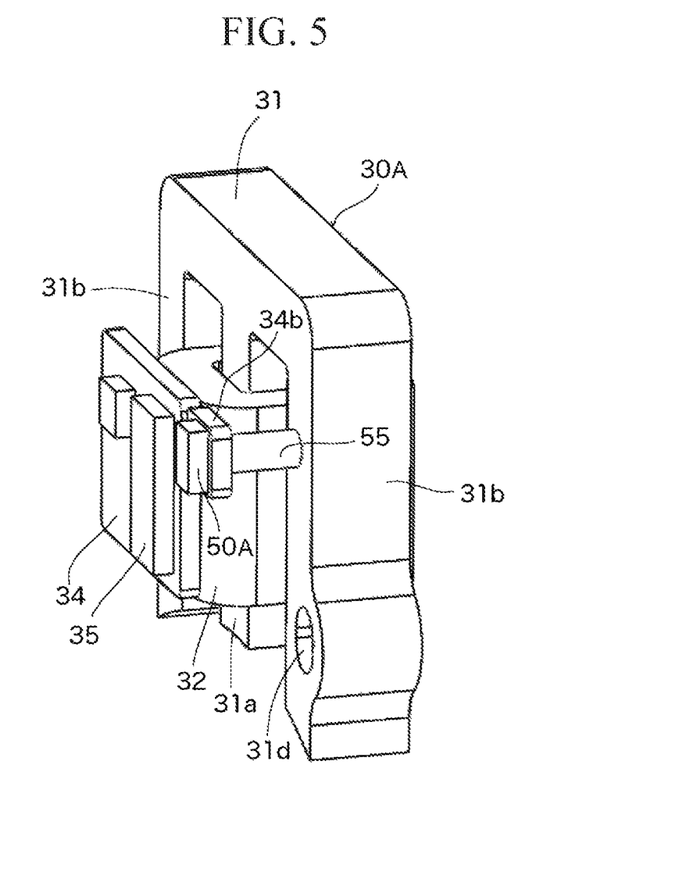
FIG. 5 is a lateral perspective view showing the ignition coil unit of a second embodiment of the engine knocking detection apparatus according to the present disclosure.
Figure 6:
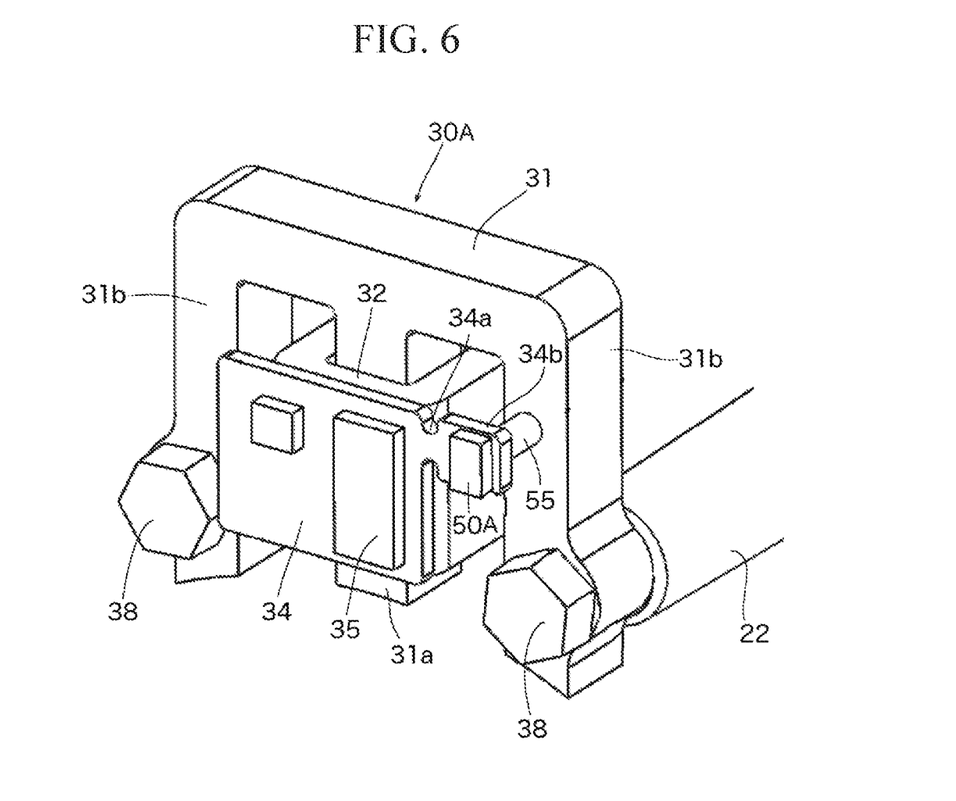
FIG. 6 is a front perspective view showing the ignition coil unit of the second embodiment in a securely attached state.

FIG. 5 and FIG. 6 show an ignition coil unit 30A of a second embodiment of the engine knocking detection apparatus according to the present disclosure. It should be noted that the basic configuration of the ignition coil unit 30A of the second embodiment is substantially the same as that of the aforementioned ignition coil unit 30 of the first embodiment. Therefore, only differences between the ignition coil unit 30A of the present example and the aforementioned ignition coil unit 30 of the first embodiment will be described below.

In the ignition coil unit 30A of the present example, a relatively small rectangular mounting plate portion 34*b* is provided in an extended manner on a lateral side of the control circuit board 34 (in particular, a position on a lateral side of the microcomputer 35 mounted on the control circuit board 34) via a constricted portion 34*a* of narrow width. The mounting plate portion 34*b* is provided in an extended manner up to a position where it faces one of the end pieces 31*b* of the iron core 31 of the ignition coil unit 30A, and has an accelerometer 50A mounted thereon (on a surface on the side opposite to the cylinder 21 side). The accelerometer 50A and the microcomputer 35 are connected through printed wiring or the like formed on the control circuit board 34. In this case, the accelerometer 50A mounted on the mounting plate portion 34*b* is positioned right in front of the one of the end pieces 31*b* of the E-shaped iron core 31, and is disposed in substantially parallel with a plane orthogonal to the crank shaft 27. Further, in order to transmit vibration of the cylinder 21 to the accelerometer 50A, a cylindrical vibration transmitting member 55 made of, for example, resin, inorganic material, or metal is interposed between the mounting plate portion 34*b* and the one of the end pieces 31*b* of the iron core 31. For example, one end surface of the vibration transmitting member 55 is securely bonded to the iron core 31 side with an adhesive or the like and the other end surface thereof is lightly pressed against and contacted to the mounting plate portion 34*b*.

Also in the knocking detection apparatus of the second embodiment that adopts the ignition coil unit 30A with the aforementioned configuration, although the detection sensitivity for vibration (acceleration) may possibly be slightly lower than that of the first embodiment, substantially the same function and effects as those of the aforementioned first embodiment can be obtained. Further, in the second embodiment, since the accelerometer 50A is mounted on the control circuit board 34, the procedures for connecting the accelerometer 50A and the microcomputer 35 by means of a cable can be omitted, and there is also an advantage that failure such as breaking of a cable does not easily occur.

It should be noted that in the aforementioned embodiment, when knocking is determined to have occurred, control, for example, a process of retarding the ignition timing is performed to suppress or avoid the knocking. However, such control is not always necessary, but only warning may be issued by, for example, simply turning on an alarm lamp.

Further, in the aforementioned embodiments, the chain saw with the small air-cooled two-stroke gasoline engine mounted thereon as a power source has been described as an example, but it goes without saying that the present disclosure can also be used in small reciprocating engines for use in portable power working machines, such as engine cutters, hedge trimmers, brush cutters, and power blowers; small power generators; and small boats as well as chain saws with a four-stroke gasoline engine mounted thereon.

What is claimed is:

1. An internal combustion engine comprising:
   an engine cylinder;
   an ignition coil unit securely attached to the engine cylinder, wherein the ignition coil unit comprises (i) an iron core securely attached to the engine cylinder, (ii) a coil wound around the iron core energized by a magnet on a flywheel of the internal combustion engine to generate a high voltage for ignition, and (iii) a control circuit attached to the coil and configured to control a timing of the ignition; and
   an accelerometer securely attached to the iron core separately from the control circuit, the accelerometer is configured to sense vibrations of the engine cylinder and provide the control circuit with electrical signals representing the sensed vibrations, wherein the control circuit is configured to detect knockings of the internal combustion engine from the electrical signals from the accelerometer and control the timing of the ignition to suppress the knockings.

2. The engine knocking detection apparatus according to claim 1, wherein the accelerometer is formed in a shape of a plate coplanar with an imaginary plane and is attached to the iron core so that the imaginary plane is orthogonal to a crank shaft of the engine.

3. The engine knocking detection apparatus according to claim 1, wherein the iron core has first and second opposite surfaces, and the accelerometer is attached to one of the first and second surfaces of the iron core opposite to the other of the first and second surface that faces the engine cylinder.

4. The engine knocking detection apparatus according to claim 1, wherein the accelerometer is attached to the iron core on a lateral side of a microcomputer mounted on the control circuit.

5. The engine knocking detection apparatus according to claim 1, wherein the coil, the control circuit, and the accelerometer are covered with a resin molded cover.

6. The engine knocking detection apparatus according to claim 1, wherein the accelerometer is directly attached to the iron core and connected to the control circuit by means of a signal wire.

7. The engine knocking detection apparatus according to claim 1, further comprising:
   a mounting plate on which the accelerometer is mounted; and
   a vibration transmitting member standing from the iron core and supporting the mounting plate away from the iron core on a lateral side of the control circuit, wherein the vibration transmitting member is formed to transmit the vibrations of the engine cylinder to the mounting plate.

8. The engine knocking detection apparatus according to claim 7, wherein the mounting plate is formed as an extension of a board of the control circuit extending in coplanar with the board, wherein the extension comprises a narrow bridge connecting the board and the mounting plate.

9. The engine knocking detection apparatus according to claim 7, wherein the mounting plate is extended to face the iron core, and the vibration transmitting member stands between the mounting plate and the iron core.

* * * * *